US008423224B1

(12) United States Patent
Fuciarelli et al.

(10) Patent No.: US 8,423,224 B1
(45) Date of Patent: Apr. 16, 2013

(54) METHODS AND APPARATUS FOR CONTROLLING DEPLOYMENT OF SYSTEMS

(75) Inventors: David A. Fuciarelli, Tucson, AZ (US); David L. Ii, Tucson, AZ (US); James R. Zuber, Selden, NY (US)

(73) Assignee: Raytheon Company, Waltham, MA (US)

( * ) Notice: Subject to any disclaimer, the term of this patent is extended or adjusted under 35 U.S.C. 154(b) by 1386 days.

(21) Appl. No.: 12/113,018

(22) Filed: Apr. 30, 2008

Related U.S. Application Data

(60) Provisional application No. 60/915,411, filed on May 1, 2007.

(51) Int. Cl.
*G05D 1/12* (2006.01)
*G06G 7/48* (2006.01)

(52) U.S. Cl.
USPC .................................. 701/23; 701/24; 703/8

(58) Field of Classification Search .................. 701/23, 701/24, 25; 235/415
See application file for complete search history.

(56) References Cited

U.S. PATENT DOCUMENTS

| | | | | |
|---|---|---|---|---|
| 5,957,837 A * | 9/1999 | Raab | ............................ | 600/300 |
| 6,076,030 A * | 6/2000 | Rowe | ............................ | 701/50 |
| 6,122,572 A * | 9/2000 | Yavnai | ............................ | 701/23 |
| 7,603,212 B2 * | 10/2009 | Ariyur et al. | ............................ | 701/23 |
| 7,765,038 B2 * | 7/2010 | Appleby et al. | ............................ | 701/23 |
| 7,970,507 B2 * | 6/2011 | Fregene et al. | ............................ | 701/23 |
| 8,186,589 B2 * | 5/2012 | Ben Asher et al. | ............................ | 235/411 |
| 2003/0213358 A1 * | 11/2003 | Harding | ............................ | 89/1.11 |
| 2004/0068351 A1 * | 4/2004 | Solomon | ............................ | 701/24 |
| 2005/0004723 A1 * | 1/2005 | Duggan et al. | ............................ | 701/23 |
| 2007/0021880 A1 * | 1/2007 | Appleby et al. | ............................ | 701/23 |
| 2007/0093946 A1 * | 4/2007 | Gideoni | ............................ | 701/24 |
| 2007/0112696 A1 * | 5/2007 | Vane et al. | ............................ | 706/10 |
| 2007/0168117 A1 * | 7/2007 | Howard et al. | ............................ | 701/207 |
| 2009/0203588 A1 * | 8/2009 | Willman et al. | ............................ | 514/12 |
| 2009/0219393 A1 * | 9/2009 | Vian et al. | ............................ | 348/144 |
| 2009/0240366 A1 * | 9/2009 | Kaushal et al. | ............................ | 700/110 |
| 2009/0326735 A1 * | 12/2009 | Wood et al. | ............................ | 701/2 |
| 2012/0046818 A1 * | 2/2012 | Nettleton et al. | ............................ | 701/23 |

* cited by examiner

*Primary Examiner* — Thomas Black
*Assistant Examiner* — Tyler Paige
(74) *Attorney, Agent, or Firm* — Cantor Colburn LLP

(57) ABSTRACT

Methods and apparatus for controlling deployment of systems according to various aspects of the present invention operate in conjunction with at least one deployable asset, a scoring system, and an optimization system. The scoring and optimization systems provide an optimized solution to mission planning, asset positioning, and control of multiple entities within a geographic region. The system combines a scoring method with an optimization method to quickly select a globally optimal solution from a larger set of potential solutions.

14 Claims, 5 Drawing Sheets

|   |   |   |
|---|---|---|
| 3 | 4 | 5 |
| 2 | UAV | 6 |
| 1 | 8 | 7 |

*FIG. 4A*

|    |    |     |    |    |
|----|----|-----|----|----|
| 14 | 15 | 16  | 17 | 18 |
| 13 | 3  | 4   | 5  | 19 |
| 12 | 2  | UAV | 6  | 20 |
| 11 | 1  | 8   | 7  | 21 |
| 10 | 9  | 24  | 23 | 22 |

*FIG. 4B*

METHODS AND APPARATUS FOR CONTROLLING DEPLOYMENT OF SYSTEMS

CROSS-REFERENCES TO RELATED APPLICATIONS

This application claims the benefit of U.S. Provisional Patent Application No. 60/915,411, filed May 1, 2007, and incorporates the disclosure of the application by reference.

BACKGROUND OF INVENTION

Mission planning systems provide various elements with instructions on how to perform a given function. The goal of each system is to increase the measure of effectiveness of the function. For example, when searching for a target in a large area, a mission planning system may determine how best to search the area for the target. A current system may follow the general process of finding the target, fixing its location and vector, tracking the target, targeting the target with a weapon, engaging the target with the weapon, assessing the damage caused by the weapon to the target, and then repeating the process until the target is adequately neutralized. This process, however, tends to be static, rigid it its deployment, and unable to adapt to changing circumstances.

One example of a traditional search method is that of sequentially tracing slightly offset ovals over a search area until the entire area has been searched, often referred as the Zamboni method. This method is simple to program, requires little computational complexity, and is easily tested. It is also, however, inefficient and sub-optimal when prior information is available.

Situational awareness has been identified as a key concept to be included in mission planning systems. Situational awareness allows missions to adapt to real-time environments and deviate from a pre-programmed plan. Including situational awareness, however, adds complexity and cost to current systems and may further be unworkable in some urban environments. Further, controlling multiple assets in a given area at present requires increases in both available bandwidth and computing resources.

SUMMARY OF THE INVENTION

Methods and apparatus for controlling deployment of systems according to various aspects of the present invention operate in conjunction with at least one deployable asset, a scoring system, and an optimization system. The scoring and optimization systems provide an optimized solution to mission planning, asset positioning, and control of multiple entities within a geographic region. The system combines a scoring method with an optimization method to quickly select a globally optimal solution from a larger set of potential solutions.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 4A representatively illustrates a search grid in accordance with an exemplary embodiment of the present invention;

FIG. 4B representatively illustrates a larger search grid in accordance with an exemplary embodiment of the present invention;

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various computers, networks, and movable entities, e.g., mobile computing platforms, servers, databases, local networks, and the like, which may carry out a variety of functions. In addition, the present invention may be practiced in conjunction with any number of networks, types of information, or mission criteria, and the systems described are merely exemplary applications for the invention. Further, the present invention may employ any number of conventional techniques for transferring data, calculating information, presenting information, storing information, and the like.

Methods and apparatus for controlling deployment of assets according to various aspects of the present invention operate in conjunction with at least one autonomous planner 102 adapted to calculate and optimize a mission plan, task assignment, route planner, or system allocation in a dynamically changing environment. The autonomous planner 102 may be connected to remote systems via a communications link 106, for example to other autonomous planners 102.

Figure 1:
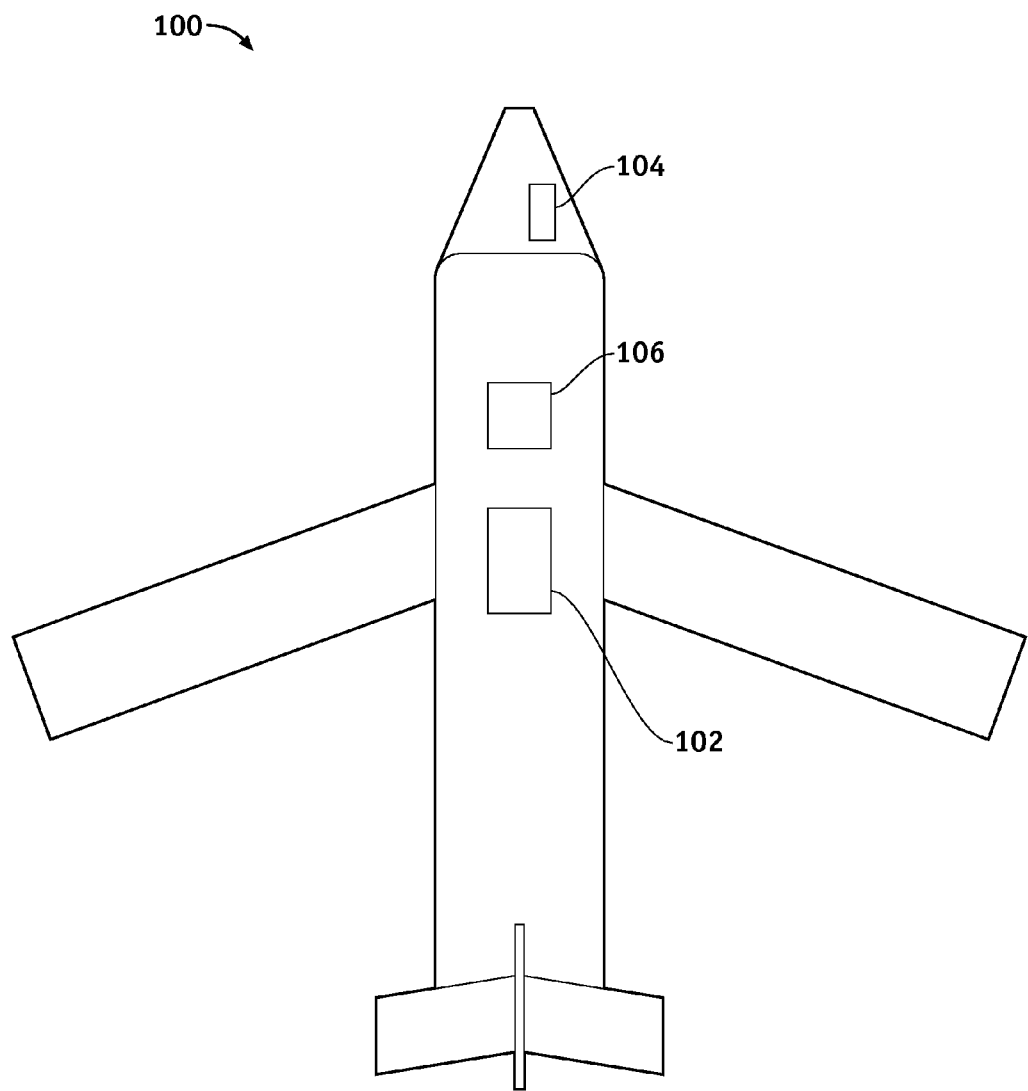
FIG. 1 representatively illustrates a deployable asset in accordance with an exemplary embodiment of the present invention.

For example, referring to FIG. 1, a deployable asset 100 according to various aspects of the present invention operates in conjunction with the autonomous planner 102, a dynamic data source 104, and the communications link 106. The dynamic data source 104 provides information regarding the surrounding area to the autonomous planner 102. The autonomous planner 102 processes the data from the dynamic data source 104 through a series of probabilistic models and/or optimization techniques before using the results to help guide the deployment of the deployable asset 100. The communications link 106 may receive and/or transmit information, such as to and from other deployable assets 100 or a central location for further processing or monitoring.

The deployable asset 100 is an asset whose movement, direction, power, or other characteristic is controlled, at least in part, by the results of the autonomous planner 102. The deployable asset 100 may comprise any system capable of being moved, configured, utilized, or arranged for a deliberate purpose, such as an unmanned aerial vehicle (UAV), a sensor such as a radar system or airborne surveillance system, a weapons system, or manufacturing equipment. The deployable asset 100 may also comprise several different types of entities for a given mission. For example, in a combined air and land mission, both air-based and ground-based assets may be deployed. In one exemplary embodiment of the present invention, the deployable assets 100 comprise multiple UAVs operating to search a given geographic area. In another embodiment, the deployable assets 100 comprise at least one ground-based radar system.

The dynamic data source 104 generates information about an environment that is subject to change. For example, the dynamic data source 104 may comprise a sensor capable of monitoring one or more conditions in a particular space and generating corresponding data, such radar systems, radio frequency antennae, satellites, seismic sensors, sonar sensors, weather sensors and computers, video capture devices, or a data feed. In one exemplary embodiment, the dynamic data source 104 may comprise a GPS receiver, a video capturing device, a mapping system, and a target identification system. In another embodiment, the dynamic data source 104 may comprise one or more x-band radar systems monitoring an area around one or more deployable assets 100. Alternatively, the dynamic data source 104 may comprise a transceiver, a collision avoidance system, and a targeting system.

The dynamic data source 104 may further provide to the autonomous planner 102 dynamic information, such as continuously or intermittently updated information, about a geographic area. For example, the dynamic data source 104 may provide the autonomous planner 102 with substantially real-time targeting information. Thus, the dynamic data source 104 may be able to identify a target and provide updated information regarding the location and vector of the target. The dynamic data source 104 may be further configured to identify an area around a known target and provide information on the movement of non-targets within an area adjacent to the target.

The communications link 106 allows the deployable asset 100 to send or receive information, such as data received by or from the dynamic data source 104 or data generated by the autonomous planner 102. The communications link 106 may comprise any system for allowing communication between two or more locations or entities, such as a fixed operations base and a UAV. For example, referring to FIG. 1, the communications link 106 in a UAV may comprise a transceiver configured to transmit and receive information calculated by the autonomous planner 102 according to information from a remote source, such as another deployable asset 100 like a radar system.

The autonomous planner 102 determines a course of action for at least one deployable asset 100 according to various data and one or more algorithms, for example to achieve a mission or set of tasks. For example, in the case of multiple deployable assets 100, the autonomous planner 102 may provide optimal solutions directing which deployable asset 100 should perform what function, where that function should be performed in a given geographic space, and when that function should be performed. The autonomous planner 102 may also direct multiple deployable assets 100 simultaneously while operating without human intervention. The autonomous planner 102 may also be adapted to perform multiple problems, tasks, plans, or missions without extensive programming steps or reformatting processes.

For example, in the present embodiment, the autonomous planner 102 combines Bayesian success metrics with an optimization method to effectively determine the optimal function of at least one deployable asset 100 within an particular geographic space. The autonomous planner 102 may also determine the optimal solution to a given mission with low-bandwidth communication systems and without extensive computational resources. As a result, the present methods and apparatus may be used as both an upgrade to existing systems and incorporated into as yet undeveloped design packages.

The autonomous planner 102 may comprise an independent computing platform installed on a deployable asset 100 or a central computing platform housed at a fixed location that provides instructions to the deployable asset 100. The computing platform may comprise a system as simple as a dedicated processor and a memory module. The computing platform may also be integrated into preexisting systems or computers such as an avionics computer or a server. The autonomous planner 102 may further be implemented entirely or partially through software stored in the memory and executed by the processor, and/or may be implemented entirely or partially via hardware.

Figure 2:
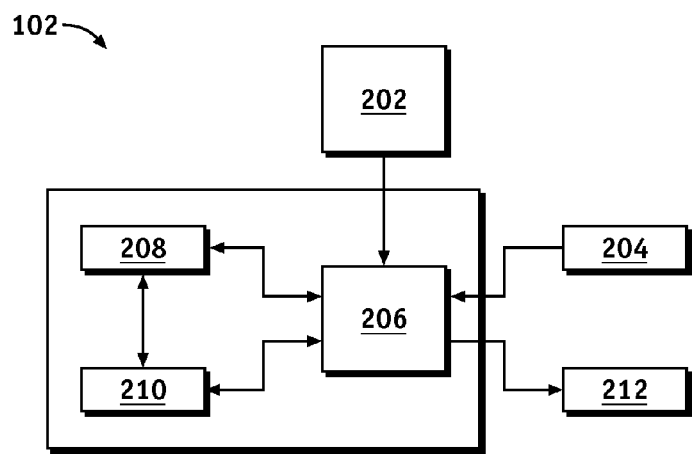
FIG. 2 is a block diagram of a system for a computing platform.

Referring to FIG. 2, the autonomous planner 102 may combine initial reference data 202, situational information 204 from the dynamic data source 104, and other information to determine an optimal solution for a given mission. The initial reference data 202 may be provided from any appropriate source, such as a memory where the initial data 202 is stored, and provides the autonomous planner 102 with the basic information used by the control system 206. The initial reference data 202 may comprise any information that is stored on the autonomous planner 102 or used initiate operation, such as the mission or task parameters, the number of deployable assets 100 available or in use, geographic constraints, individual probability equations, initial values for variables, criteria for optimization, and the like. The initial reference data 202 may be configured in such a way that it can be loaded onto any autonomous planner 102 resulting in a fully customizable mission plan or task without significant alteration to the autonomous planner 102.

The situational data 204 provides the autonomous planner 102 with a set of dynamic data that represents changing environmental conditions. For example, situational data 204 may comprise information from the dynamic data source 104. The information provided by the dynamic data source 104 may comprise information such as input from a radar system, data from targeting systems, video, target identification or destruction, new information that overrides some or all of the initial reference data 202, data from other deployable assets 100, weather conditions, and the like. Situational data 204 allows the autonomous planner 102 to adapt to changing conditions.

The autonomous planner 102 processes the initial data 202 and the situational data 204 to generate deployment results. In the present embodiment, the autonomous planner 102 includes a control system 206 that processes the initial reference data 202, for example in conjunction with a scoring system 208 and an optimization system 210. The control system 206 may also receive dynamically changing situational data 204 for processing by the scoring system 208 and the optimization system 210. After processing the data, the control system 206 may then send instructional data 212 to a system, such as the deployable asset 100 or to another remote location where it maybe used to direct the action of the deployable asset 100.

Figure 3:
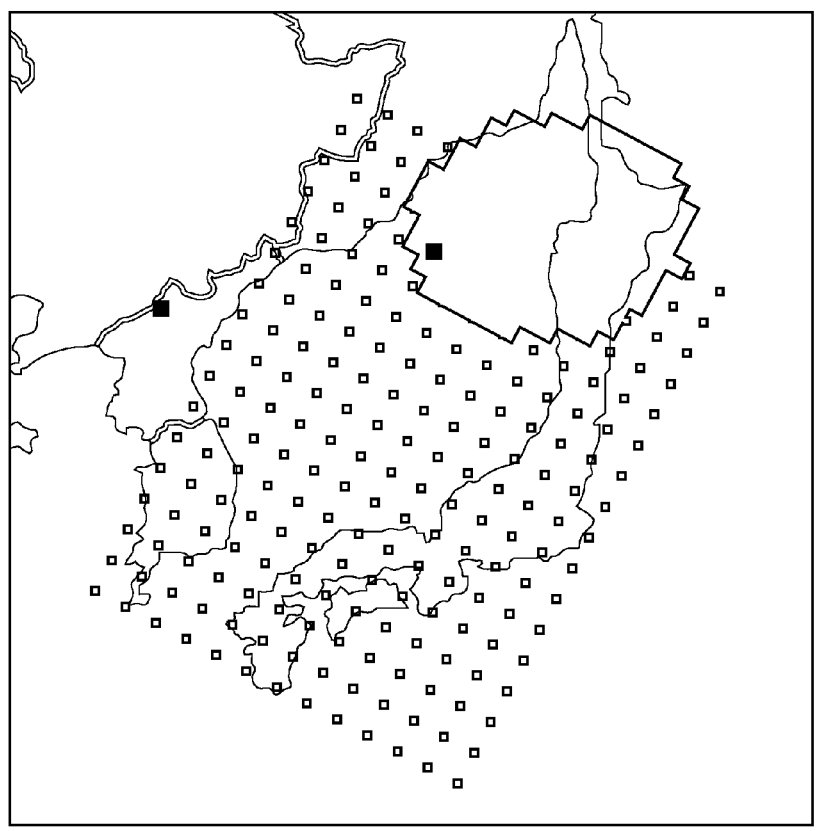
FIG. 3 representatively illustrates radar coverage of a single deployable asset.

The scoring system 208 processes data from one or more sources to calculate a score corresponding to a projected effectiveness of the deployable asset 100 under particular set of circumstances, such as in a geographic area or under particular operating conditions. For example, in one embodiment the scoring system 208 may calculate the effectiveness of a radar system comprised of at least one deployable asset 100. Referring now to FIG. 3 one goal of the radar system may be to provide radar coverage to as large a population density area as possible given a fixed number of deployable assets 100. For example, a population map of Japan may be divided into a grid pattern with each grid representing some percentage of the total population. The placement of a single deployable asset 100 within the geographic space would therefore provide coverage to some grids and not others. Locations for the deployable asset 100 that provide greater total population coverage may receive a higher score than grid locations that result in lower total coverage.

In another embodiment, the scoring system 208 may also be configured to provide a probabilistic score based on the combination of several independent probabilities. For example, the scoring system 208 may be configured to return a score based on the searching capability of a UAV over a region or series of regions within a larger geographic area. If the mission assigned to the UAV is to locate and engage a particular target within the geographic area, the scoring system 208 may compile a score based on factors such as the probability of the target being within a particular grid of the geographic area, the probability of being able to detect the target, and the probability of successful engagement if the target is detected.

The scoring system 208 may also be configured to take into account the location of other deployable assets 100 within the geographic space, reduce or eliminate any overlap between deployable assets 100, individual capabilities of the deployable asset, and place greater weight to some geographic regions over other regions.

The scoring system 208 may comprise any suitable system for calculating the score, such as summing function, a probabilistic algorithm, a Bayesian model, or a combination of methods configured in computer readable code. The scoring system 208 may further comprise a collection of probabilistic arrays or the product of one more individual probability models. For example, a Bayesian mixed integer programming method may be used to combine several independent variables and their associated probabilities at a given instant in time to arrive at a overall probability value for a given region. In one embodiment, the scoring system utilizes a Bayesian net for computing the scores.

The scoring system 208 may also calculate scores for several geographic locations or other conditions. For example, the scoring system 208 may iteratively calculate a set of probability values for mission success for a set of regions around the deployable asset 100 before passing the results to the optimization system 210 for further processing. The regions around the deployable asset 100 may be considered in various steps or sub-regions. For example, referring to FIG. 4A, the deployable asset 100 may be located in the center of a grid representing nine different localized geographic areas within a larger geographic space. The areas immediately adjacent to a deployable asset 100 may be considered a single look-ahead region and the deployable asset 100 may be repositioned into any one of the eight possible adjacent areas. The dynamic data source 104 may scan each of the adjacent areas and pass that information to the control system 206. The scoring system 208 then calculates a score for each of the eight possible choices and passes that information to the optimization system 210 for further processing.

Alternatively, more than one look-ahead region may be considered. Referring now to FIG. 4B, the deployable asset 100 may be located in the center of a grid representing twenty-five different geographic locations within a greater geographic space. The first look-ahead region is the region of grids immediately adjacent to the deployable asset 100 and a second look-ahead region is spaced outward from the first look-ahead region. In this configuration, the scoring system 208 calculates a score for all twenty-four grids and passes that information to the optimization system 210. Additional look-ahead regions may be added, such as additional layers or rings representing different possible paths for deployment of the asset 100. Adding look-ahead regions to the scoring system 208 may provide additional information which the optimization system 210 may use to arrive at a result.

The scoring system 208 may be initialized with the initial reference data 202 prior to calculating the first set of scores. Subsequent iterations may then be updated with situational data 204 before continuing with the next set of calculations. Including situational data 204 into subsequent calculations allows the autonomous planner 102 to adapt to a dynamically changing environment. Adapting to dynamic factors in a geographic region helps prevent the overlapping of efforts by multiple entities 100 and improves real-time engagement.

The optimization system 210 tends to determine an optimum set of candidate regions for further consideration by the autonomous planner 102 from a larger set of potential candidate regions as calculated by the scoring system 208. The optimization system 210 may be configured in any suitable manner to discard from consideration individual regions that do not meet a predetermined set of criteria, such as an upper or lower limit. In the present embodiment, for example, the optimization system 210 may comprise a branch and bound optimization algorithm that may be programmed to provide a candidate solution or group of solutions for further investigation by the autonomous planner 102.

Figure 5:
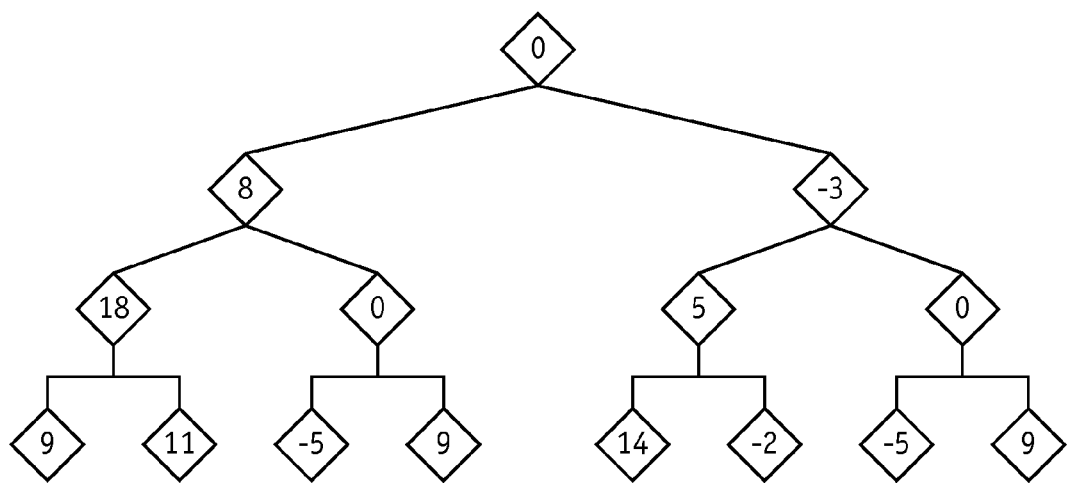
FIG. 5 illustrates a search tree.

Referring to FIG. 5, the present optimization system 210 first creates a search tree from the data received from the scoring system 208. For example, the top level of the tree represents the 0-node, or the current location of the deployable asset 100. The next level of the tree represents the possible next location of the deployable asset 100. In this case there are two potential choices in the first look ahead region and each node is represented by a score as calculated by the scoring system 208. The next level represents a second look ahead region or a potential second location based upon first moving to the location in the first look ahead region. Each node in this region is given a score by the scoring function. This process may be repeated for as many look ahead regions are utilized in a given mission plan or task.

Once a search tree has been created, each potential path down the search tree is compared against a set of criteria. This comparison is used to bound the search and limits the possible choices by eliminating those potential choices that do not meet the criteria. For example, referring again to FIG. 4, if the mission is to obtain a maximum value for a given search and it is known from the initial reference data 204 that the score from one node to the next could not exceed more than a ten point change in value, then it is possible to discontinue searching down one or more branches.

In the example of FIG. 5, this is shown by first following the path from the 0-node to the node in the next step with the score 8. From this point the scoring system 208 returned a value of 18 for one node and a value of 1 for a second node. The scoring system 208 finally returned ultimate scores of 9 and 12 for the node with the value of 18 and −5 and 9 for the node with the value of 1. Because of the initial criteria, the path down the branch with the node values of 8, 1, and −5 or 9 can be discarded from the search because the path cannot return a value greater than 11 and the path through the node with the value of 18 has already produced a result of 12 which is greater than 11. The same process could be used to discard the branch down the right hand side of the search tree through the node with the value of 0.

By discarding certain branches, the optimization system efficiently proceeds through the data provided by the scoring system 208 making it unnecessary to consider every possible candidate and calculate its ultimate solution. Once a set of non-discarded branches is determined, an optimal branch is selected from the set and the result is passed back to the control system 206. The optimization system 210 may be configured to bound the search based on various criteria depending on the desired mission plan or task being performed by the deployable asset 100.

Example 1

In one exemplary embodiment, a single autonomous planner 102 may be adapted to perform an analysis of a geographic region and determine the optimal location for one or more deployable assets 100. For example, the mission may comprise placing some number N mobile forward-based x-band radar units within a geographic region so as to provide the greatest amount of threat detection to protect a given population within the geographic region. The autonomous planner 102 may be programmed with a set of initial reference data 202 relating to the geographic space, such as a map of the geographic region, population densities of the geographic region, the number N of radar units available for placement, the range capability of each radar unit, the probabilistic equations to be used by the scoring system 208, and the criteria to be used by the optimization system 210.

Figure 6:
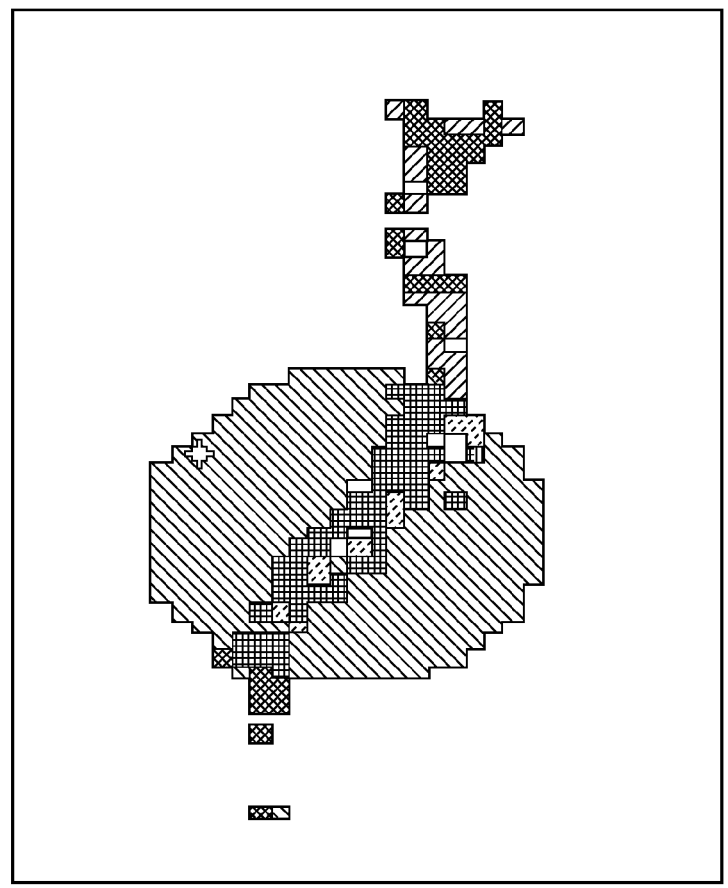
FIG. 6 illustrates coverage of a single deployable asset within a population grid.

Once the autonomous planner 102 has been initialized, it may then iteratively begin searching various points within the geographic region to determine the best location for each of the N radar units. The autonomous planner 102 may randomly place each radar unit within the space and determine a score for unit based on its coverage. For example, referring now to FIG. 6, a single radar unit may be positioned on a map and a score calculated based on the total coverage area. The scoring system 208 may then calculate scores for the radar unit if it were moved to a one of a series of possible locations adjacent to its initial position. After calculating the scores the optimization system 210 creates a search tree based on all of the scores and compares the scores based on the global change in coverage. Branches of the search tree that result in a reduced coverage may be discarded from further analysis in favor of branches that result in a greater total coverage. The optimization system 210 may then choose a new location for each radar unit from the remaining possible locations that result in the greatest coverage. The scoring system 208 then calculates a new set of scores based on the newly assigned radar positions and the optimization process is repeated. The scoring and optimization process is repeated until a globally optimal location for the radar unit is known.

Figure 7:
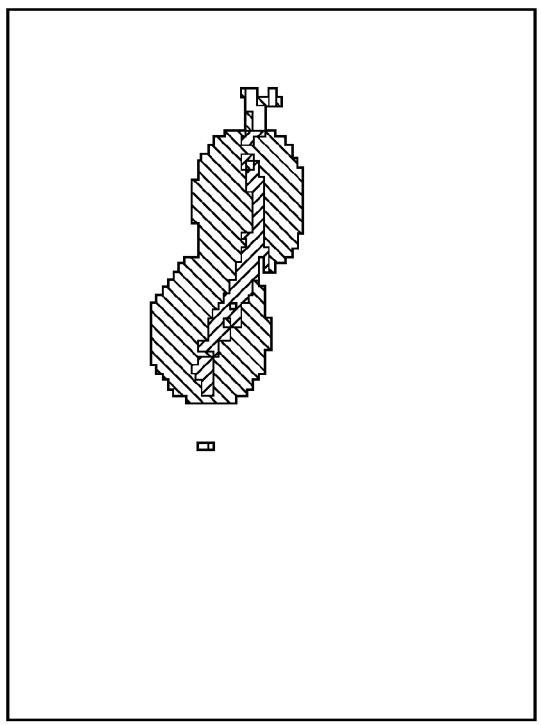
FIG. 7 illustrates coverage of a two deployable assets within a population grid.

Referring now to FIG. 7, the process may be performed with multiple radar units. Again, each radar unit may be randomly placed within the geographic space and a scored calculated for each unit. The scoring system 208 and the optimization system 210 may then iteratively determine the optimum location for each radar unit. On completion, each of the radar units may be dispatched to their identified location and set into operation.

The autonomous planner 102 may further be adapted to recalculate the optimal positions of each radar unit as certain factors develop. For example, if an area that originally was not covered required coverage for some predetermined reason, the autonomous planner 102 could redirect the deployment of some or all of the radar units. The autonomous planner 102 may be refreshed with situational data 204 pertaining to the need to cover the given geographic region. The scoring and optimization process could then be repeated in order assure optimal coverage given the changing circumstances. The autonomous planner 102 may also be configured to take into account downtime of certain radar units due to repair or regular service intervals and redeploy the radar units to maintain optimal coverage at all times. For example, if one radar system went offline situational data 204 may be sent to the autonomous planner 102 reflecting the change to the total coverage area. The autonomous planner 102 could then run the scoring system 208 and optimization system 210 again based on the new information to determine new locations for each unit.

Example 2

In another exemplary embodiment, some number M of deployable assets 100 may be individually connected to an independent autonomous planner 102 and assigned the task of locating one or more targets within a three-dimensional geographic area. For example, three UAVs may each be associated with an autonomous planner 102, wherein the autonomous planner 102 directs solely the movement of the corresponding UAV.

Each autonomous planner 102 may be programmed with initial reference data 202, such as a map of the geographic area, no-fly zones within the geographic area, target identification data, and the total number of UAVs utilized in the mission. The autonomous planner 102 may further be adapted to send and receive information from the other UAVs through the communications link 106 to reduce duplicate search patterns, report on target acquisition or status, receive score and optimization data generated by other autonomous planners 102, and avoid mid-air collisions.

Figure 8:
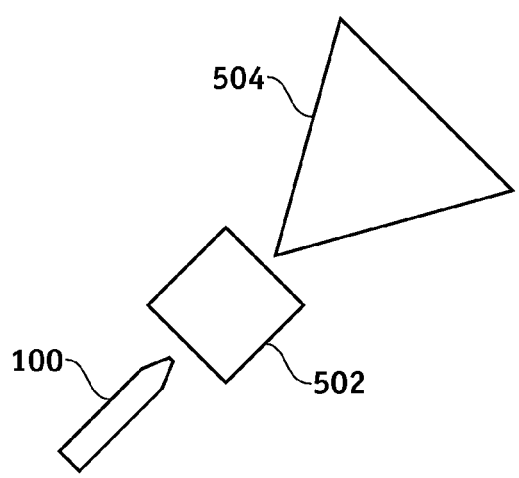
FIG. 8 illustrates multiple look ahead regions.

After the autonomous planner 102 has been programmed with the initial reference data 202, the corresponding UAV may be launched into the three-dimensional geographic area and begin independently searching the area. The scoring system 208 may then use the initial reference 202 and information from one or more dynamic data sources 104 to calculate a set of scores for an area around the UAV. For example, referring to FIG. 8, if the autonomous planner 102 was programmed to utilize two look ahead regions a score for each region would be calculated. For example, a first look ahead region 502 may comprise an area immediately adjacent to the UAV. A second look ahead region 504 may comprise an area further away from the UAV compared to the first look ahead region. Using the scores from each region, the optimization system 210 would create a search tree and begin bounding, or limiting, the search. For instance, if there are known no-fly regions, then one or more sub-regions with a look ahead region may be identified as a branch of the tree that need not be searched.

From the bounded search tree a new location is selected and the UAV would be directed to that location. As the UAV moves into the new location the scoring and optimization process would be repeated for the new area. The autonomous planner 102 may also receive information from the other UAVs in the space that may include updated positional information, scoring results for areas around a particular UAV, and time since performing a scoring and optimization function for a given area.

In one embodiment, the autonomous planner 102 may be placed on-board the UAV. In an alternative embodiment, the autonomous planner 102 may be placed at a remote location and communicatively linked to the UAV wherein it may still perform the searching calculations and control the movement of the UAV. In yet another embodiment, the deployable asset 100 may comprise a ground based weapon system or a combination of both air and ground based systems.

In the foregoing specification, the invention has been described with reference to specific exemplary embodiments. Various modifications and changes may be made without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any appropriate order and are not limited to the specific order presented in the claims. Additionally, the components and/or elements recited in any apparatus claims may be assembled or otherwise operationally configured in a variety of permutations and are accordingly not limited to the specific configuration recited in the specification and shown in the drawings.

Benefits, advantages, and solutions to problems have been described above with regard to particular embodiments. Any benefit, advantage, solution to problem or any element that may cause any particular benefit, advantage or solution to occur or to become more pronounced are not to be construed as critical, required or essential features or components of any or all the claims.

As used in this description, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the invention.

The invention claimed is:

1. A planning system for deploying a deployable asset in a geographic space, comprising:
   a scoring system having a processor configured to:
      calculate a score for each of a plurality of possible deployment locations in the geographic space for the deployable asset, wherein the score corresponds to a projected effectiveness of the deployable asset at the deployment location; and
   an optimization system responsive to the scoring system and having a processor configured to:
      compare the score from the scoring system for each of the deployment locations to a threshold, wherein the threshold corresponds to a selected level of projected effectiveness; and
      discard the possible deployment locations corresponding to scores that fail to meet the threshold; and
      select a deployment location for the deployable asset from the remaining possible deployment locations.

2. A planning system according to claim 1, wherein the scoring system is further configured to incorporate data from a dynamic data source to calculate the score for the plurality of possible deployment locations.

3. A planning system according to claim 1, further comprising an autonomous planner configured to:
   receive the results of the scoring system and optimization system; and
   determine a course of action based on the results of the scoring system and optimization system.

4. A planning system according to claim 3, wherein the deployment of the deployable asset within the geographic space is dynamically linked to the autonomous planner.

5. A planning system according to claim 1, wherein the deployable asset further comprises an autonomous planner configured to house the scoring system and the optimization system.

6. A planning system according to claim 1, wherein the deployable asset further comprises a communications link.

7. A planning system according to claim 6, wherein the deployable asset is configured to interact with a second deployable asset via the communications link.

8. A planning system according to claim 1, wherein the scoring system comprises a Bayesian net.

9. A non-transitory computer readable medium storing instructions executable by a computer wherein the instructions cause the computer to execute a method for mission planning and optimization for a first deployable asset comprising:
   calculating a score with a processor for each of a plurality of possible deployment locations for the deployable asset, wherein the score corresponds to a projected effectiveness of the deployable asset at the deployment location;
   comparing the score for each of the deployment locations to a threshold, wherein the threshold corresponds to a selected level of projected effectiveness;
   discarding the possible deployment locations corresponding to scores that fail to meet the threshold; and
   selecting a deployment locations for the deployable asset according to the score for the selected deployment location.

10. A medium according to claim 9, the method further comprising:
   identifying a set of possible second deployment locations for each of the first possible deployment locations remaining after discarding the possible deployment locations corresponding to scores that fail to meet the threshold;
   calculating a score for each of the second deployment locations, wherein the score for each of the second deployment locations corresponds to a projected effectiveness of the deployable asset at second deployment location;
   calculating an overall score for each second deployment locations and its corresponding first deployment location;
   comparing each overall score a second threshold, wherein the second threshold corresponds to a second selected level of projected effectiveness;
   discarding the possible second deployment locations corresponding to overall scores that fail to meet the second threshold; and
   selecting a second deployment location for the deployable asset according to the overall score for the selected second deployment location.

11. A medium according to claim 10, wherein the second threshold is identical to the first threshold.

12. A medium according to claim 9, the method further comprising transmitting the score for each of the possible deployment locations and the selected deployment location to a remote system through a communications link.

13. A medium according to claim 9, wherein calculating the score comprises calculating the score using a Bayesian net.

14. A medium according to claim 9, further comprising:
- receiving the score and deployment locations from a second deployable asset;
- estimating a future deployment location of the second deployable asset and
- adjusting the deployment location of the first deployable asset in order to reduce the probability of overlap between the first deployable asset and the second deployable asset.

* * * * *